Figure 1:
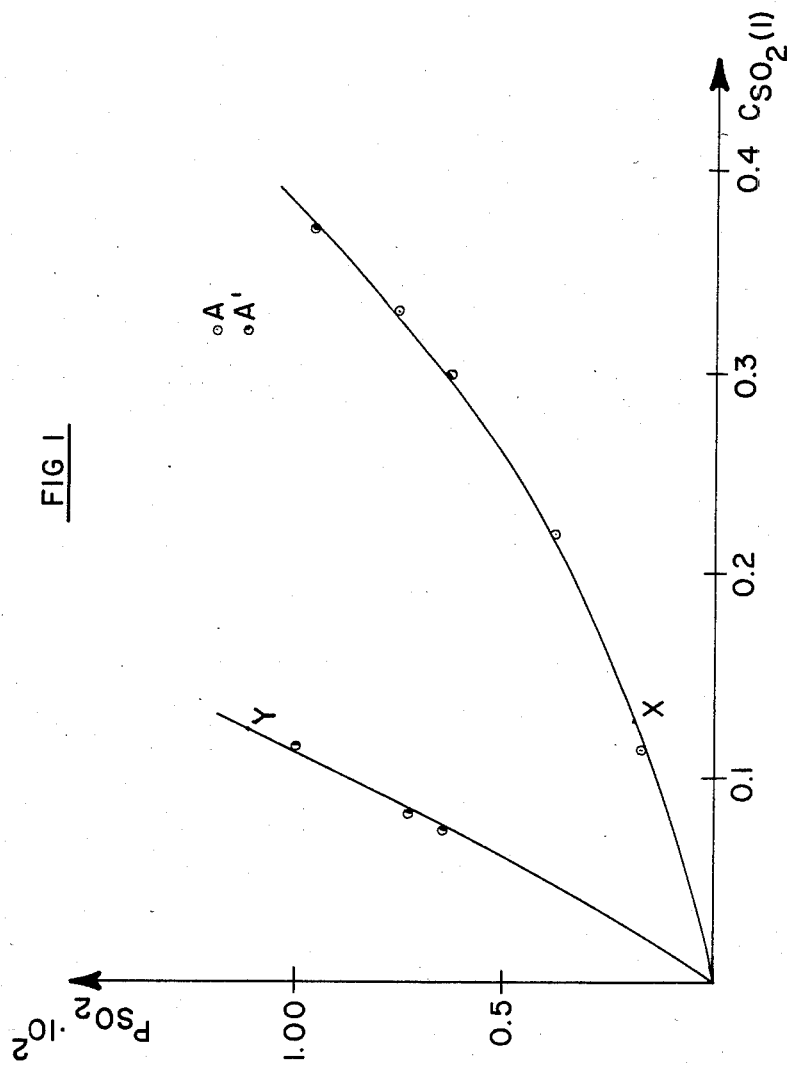

United States Patent [19]
Erga

[11] Patent Number: 4,559,212
[45] Date of Patent: Dec. 17, 1985

[54] PROCESS FOR PURIFYING GASES CONTAINING SULPHUR DIOXIDE

[75] Inventor: Olav Erga, Trondheim, Norway

[73] Assignee: Sintef, Trondheim, Norway

[21] Appl. No.: 647,736

[22] Filed: Sep. 6, 1984

[30] Foreign Application Priority Data

Sep. 8, 1983 [NO] Norway .................................. 833211

[51] Int. Cl.$^4$ ............................................. C01B 17/00
[52] U.S. Cl. .................................................... 423/243
[58] Field of Search ............... 423/243, 244 A, 244 R, 423/242 A, 242 R

[56] References Cited

U.S. PATENT DOCUMENTS 1,908,731  5/1933  Clark ............................... 423/242 X
3,798,309  3/1974  Knowles et al. ...................... 423/243
4,133,650  9/1979  Germerdonk ........................... 55/49
4,423,018 12/1983  Lester et al. ......................... 423/243

FOREIGN PATENT DOCUMENTS 1948253  4/1971  Fed. Rep. of Germany ...... 423/243
484714  11/1936  United Kingdom .

OTHER PUBLICATIONS

ERPI publication, "Aqueous Absorbents for Stack Gas Desulfurization by Absorption Stripping, Jul. 1983.

Primary Examiner—Gregory A. Heller
Attorney, Agent, or Firm—Wenderoth, Lind & Ponack

[57] ABSTRACT

Process for removal of sulphur dioxide from exhaust gases by absorption in an aqueous solution containing ions of adipic acid, and stripping of sulphur dioxide with steam. Solid adipic acid is added to the absorption solution before or during the steam stripping in such an amount that all the acid is dissolved at the stripping temperature, and after the stripping the solution is cooled to substantially below the absorption temperature to precipitate solid adipic acid which is separated off and is added again after the absorption which takes place with a solution which is unsaturated with adipic acid.

2 Claims, 1 Drawing Figure

PROCESS FOR PURIFYING GASES CONTAINING SULPHUR DIOXIDE

It is known from previous publications that $SO_2$ may be absorbed in aqueous solutions, to reach high concentrations, when absorbed $SO_2$ is bound to the solution as bisulphite ions, while the hydrogen ions which are thereby liberated, are neutralized by anion buffers present to form acidic compounds. In an example of such processes, citrate ions are used as a buffer in which the following reversible reactions take place:

$$SO_2 + 2H_2O \rightleftharpoons H_3O^+ + HSO_3^- \tag{1}$$

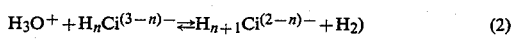

$$H_3O^+ + H_nCi^{(3-n)-} \rightleftharpoons H_{n+1}Ci^{(2-n)-} + H_2) \tag{2}$$

$n = 0, 1$ or $2$.

In a specific process known from Norwegian Patent 133 546 the pH value of the liquid is adjusted by means of the buffer in such a way that a desired high bisulphite ion concentration is obtained in the liquid even with very low $SO_2$ concentrations in the inflowing gas. After the absorption the liquid is passed on to another reaction vessel in which absorbed $SO_2$ is removed by stripping of the absorption solution with steam, whereby the absorption reactions (1) and (2) are reversed. Thereby the absorption solution is regenerated so that it may be used for new absorption, while the $SO_2$/steam mixture from the stripper is first conveyed to a condenser for condensation of steam, and the remaining $SO_2$-rich gas mixture is subjected to further processing of $SO_2$ to $S$, $H_2SO_4$ or $SO_2$ $_{(l)}$.

Processes of the type mentioned herein based on absorption/steam stripping possess considerable advantages over many competing types of processes. In the absorption/stripping processes, only liquid and gas are circulated, while in processes in which $SO_2$ is trapped by reactions forming solids or by adsorption to chemically active surfaces, it is necessary to handle large amounts of solids, and this will present much bigger problems. However, the absorption/stripping processes of said type have the disadvantage that the specific steam consumption for the stripping (in tons of steam per ton of recovered $SO_2$) will be very high when the $SO_2$ content in the gas is very low. Such low $SO_2$ concentrations occur for instance in thermal power stations operated with fossil fuel when the fuel has a low sulphur content. Thus, in practice it is difficult to get below 30–50 tons of steam per ton of stripped $SO_2$ with 1500 ppm (0.15 vol %) $SO_2$ in the inflowing gas. With a steam price of $15/ton, the steam alone will represent $450–750/ton of $SO_2$, while the market value of $SO_2$ in comparison is about 1/10 thereof.

Although it cannot be expected that processes for removal of $SO_2$ from flue gases in large boiler plants shall be profitable, it is desirable to reduce as much as possible the expenses in connection with this gas purification. Here, a possibility resides in the reduction of the energy consumption of the processes. Another possibility resides in the recovery of the sulphur values in these gases for sale. Processes based on the recovery of sulphur also possess the advantage of avoiding the expenses otherwise encountered for depositing large amounts of sulphur-containing wastes.

One way of reducing the specific stem consumption in the absorption/steam stripping processes, is to utilize the heat of condensation in the steam from the stripper to produce the stripping steam. Then a condenser is used in which pure water is evaporated at a low pressure on the cooling side, and this $SO_2$-free steam is then compressed, for instance by a steam ejector to a pressure level which is sufficiently high for the stripping. Such process solutions are known, but require considerable additional investments.

During our work with this problem we have arrived at an alternative which in an unexpectedly simple manner may reduce the specific steam consumption during the stripping process. This method is based on the use of a buffer system with very specific properties. This method may also be advantageous for the purification of gases having much higher $SO_2$-content than what is usually found in flue gases from boiler plants, such as for instance in exhaust gases from Claus-plants and in roasting gases from copper factories.

According to the present invention a new process has been found for the removal of sulphur dioxide from flue gases, wherein $SO_2$ is absorbed in an aqueous solution which contains ions of adipic acid, and is then stripped therefrom by means of steam at a temperature above the absorption temperature. The process is characterized in that solid adipic acid is added to the absorption solution before or during the steam stripping in such an amount that all the acid is dissolved at the stripping temperature, and after the stripping the solution is cooled to substantially below the absorption temperature to precipitate adipic acid which is then separated from the solution and returned to the solution after the absorption which takes place with a solution which is unsaturated with adipic acid.

According to the invention the flue gas is passed through an aqueous absorption solution which before the absorption contains ions of dissolved adipates, for instance in the form of sodium adipate (NaHAd and $Na_2Ad$, $Ad = {}^-OOC(CH_2)_4COO^-$) and as little of dissolved free adipic acid ($H_2Ad$) as practically possible, after the absorption the absorption solution is heated, and before or during the stripping of $SO_2$ with steam extra adipic acid is dissolved in the liquid, primarily in undissociated form. This adipic acid is added in such an amount that all added adipic acid is dissolved at the stripping temperature. This addition of free adipic acid makes the liquid more acidic. Hereby reaction (1) is reversed, and the specific steam consumption of the $SO_2$ stripping is reduced. The absorption temperature is normally between 20° and 70° C., for instance 55° C., while the stripping temperature will normally be about 100° C., but it may also be lower at reduced pressures or higher at elevated pressures in the stripper. Preferably the free adipic acid is added before the steam stripping. After the steam stripping adipic acid is precipitated from the absorption solution by cooling to a temperature below the absorption temperature and is separated from the solution. The solution thereby becomes more basic and the $SO_2$ absorption more effective.

Thus, absorption of sulphur dioxide takes place in a clear, aqueous solution of adipic acid/adipate. After the absorption the absorption solution is heated, and solid adipic acid is added before or during the heating. A consequence of this addition of adipic acid is that the steam requirement in the subsequent stripping is considerably reduced, which represents a big economic advantage. Adipic acid is added in such an amount that the solution is clear also during the stripping (i.e. unsaturated with respect to adipic acid). After the stripping the solution is cooled to a temperature substantially below the absorption temperature so that adipic acid is precipitated and separated, and the absorption solution will be clearly unsaturated with respect to adipic acid also during the $SO_2$ absorption.

Thus, according to the invention the specific solubility properties of adipic acid (hexanedioic acid) are utilized in a favorable manner. It should be mentioned that it is not possible to use the closely related acids glutaric acid (pentanedioic acid) and pimelic acid (heptanedioic acid) since they have solubility properties quite different from adipic acid.

Several factors make buffers based on adipic acid useful in the process of the invention: The acid/base pair of the buffer may be adjusted to an acidity which is suitable for the reversible $SO_2$ absorption according to reaction (1). The base form of the buffer during absorption, i.e. the adipate salts used, have sufficient water solubility to secure a necessary high concentration level of bisulphite ions in the liquid from the absorption vessel, viz. a stoichiometric excess relative to the total amount of hydrogen ions liberated during the $SO_2$ absorption by reaction (1). The solubility of the undissociated acid ($H_2Ad$) in the buffer is highly temperature dependent so that the concentration thereof may be reduced to a very low value by cooling the liquid before the absorption, whereas the solubility at the stripping temperature is very much higher. The cooling is made to a temperature substantially lower than the absorption temperature to ensure that the solution is unsaturated with adipic acid during absorption. The temperature to which the solution can be cooled will i.a. be determined by the local conditions such as the air temperature and the access to cooling water.

Adipic acid buffers based on e.g. $H_2Ad$/Na-adipate are also chemically stable against $SO_2$ and are non-toxic.

During our experiments with different possible buffers we have found that such adipic acid/adipate ion buffers can provide at least as good buffering effect within a limited pH-range as the same molar concentration of citric acid/citrate ion buffers. However, the adipate buffers offer the important advantage in comparison with the citrate buffers that they may be adjusted to the $SO_2$ system in such a manner that there may be added a large amount of free acid which is dissolved in the buffer before the stripping, and this amount of acid may in a simple manner be removed from the buffer by cooling-precipitation followed by solids separation before absorption. This means that the acidity of the buffer may be influenced strongly in favorable directions, so that the absorption step and the stripping step in a surprising manner are separated or made independent of each other with respect to the pH-value of the liquid.

Normally adipate concentrations of 0.1–2.5 moles/l in the absorption solutions are used, and normally adipic acid is added in an amount of 0.1–2.5 moles/l before or during the stripping, but higher or lower concentrations/amounts may also be used if this should be found advantageous.

We have found that a drastic reduction in the steam consumption per ton of $SO_2$ may be achieved in this manner. Reductions down to $\frac{1}{3}$–1/15 of the consumption without such addition of acid is obtainable, depending on the chosen cooling temperature, the concentrations of adipate ions and the added/precipitated amount of free adipic acid.

At first it was reasonable to assume that it would be most advantageous to work with adipic acid in a slurry, i.e. with a saturated absorption solution allowing precipitated adipic acid to follow the liquid through the absorption vessel and then to become dissolved when the slurry is heated prior to the stripping. However, in practice it turns out that such a "slurry process" represents a great risk of deposit formation and clogging and that it is therefore desirable to work with clear solutions both in absorber and stripper. According to the invention this is attained by cooling the process liquid to a temperature substantially below the absorption temperature, removing the precipitated acid and thereafter using the liquid for absorption while it is unsaturated with respect to adipic acid. Similarly the amount of adipic acid added before the stripping must not be higher than to allow all adipic acid to be dissolved during the stripping.

In operating the new process it is possible to add free adipic acid in finely divided solid form before, during or after the heating of the liquid before stripping, and to separate finely divided solid adipic acid from the solution used for stripping after cooling and before absorption. This separation of precipitated adipic acid may take place by settling, filtration or centrifugation, and the separated adipic acid with accompanying mother liquid is then returned to the absorption liquid after absorption of $SO_2$ therein, for renewed dissolution before the stripping.

During our experiments in which we have used adipic acid and its Na-salts as buffers, we have found that the acid may be precipitated rapidly from a saturated solution during the cooling, forming very small crystals which dissolve rapidly when added to the absorption solution which is subjected to renewed heating before stripping. This is a very important condition when precipitation and dissolution should mainly take place during the respective heat exchanges, since the residence time for the liquid therein is very short, so that the crystals get a very short time to form during the cooling and to dissolve during the heating.

U.S. Pat. No. 4,056,606 relates to a process for purifying gases containing hydrogen sulphide and, optionally, sulphur dioxide. What actually happens is that hydrogen sulphide is converted to sulphur by treatment with sulphur dioxide in the presence of several different organic polybasic acids, i.e. adipic acid and several acids which cannot be used in the present process. Since a conversion to solid sulphur takes place there is of course no mention of steam stripping.

According to U.S. Pat. No. 4,133,650 sulphur dioxide is absorbed in a solution containing glutaric acid, adipic acid and succinic acid. The absorbed sulphur dioxide is stripped from the solution, but no precipitation or addition of adipic acid between absorber and stripper takes place.

According to DE OS No. 3,132,574 sulphur dioxide is absorbed in an aqueous solution of salts of different organic acids, i.a. adipic acid. After the absorption the sulphite ions formed are oxidized to sulphate ions and precipitated as sulphate.

In the EPRI publication "Aqueous Absorbents for Stack Gas Desulfurization by Absorption/Stripping" (EPRI CS-3185, Contract TPS 77-747, Final Report, July) the use of adipic acid buffers for absorption of sulphur dioxide is discussed on page 3-77. In the last paragraph on said page the following is stated: "A possible process for absorption stripping would absorb 5.5 moles $SO_2$/kg $H_2O$ into a saturated adipic acid solution at 56° C. About 9 moles of adipic acid solids would dissolve in the rich solution as it is heated to 96° C. for stripping. Stripping steam requirements would be greatly reduced by the reduced pH, although heat is required to dissolve the adipic acid solids. After stripping, the saturated solution would be cooled to 40° or 50° C. to crystallize and separate 9 moles of adipic acid/kg H₂O. Therefore, this is a potentially attractive buffer system for absorption/stripping".

It seems quite clear that such high concentration levels as quoted have little to do with practical industrial applications (cf. the amounts normally used in the present invention). It is therefore not surprising when it is stated at the end of the report on page 4-2 in item 11: "Neither adipic acid nor diethylenediamine have properties adequate for use as an SO₂ absorbent in absorption/stripping systems." The author also has a conclusion in a summary of the report given in the introduction, where the following is staed on page S-4: "Adipic acid slurry with sodium adipate may be an attractive absorbent. The effect of temperature on slurry pH is large, but the system requires slurry handling with solids crystallization and dissolution".

An important point is that the EPRI report does not consider the possibility of carrying out the absorption without a slurry by separating the crystals from the solution at a suitable temperature before the absorption. In EPRI's own summary of the report (page iii) adipate buffers have not been mentioned at all as alternative absorbents.

Thus, in the report the specific solubility properties of adipic acid are discussed, but it is not found how these properties may be utilized in a practical acceptable manner, and the use of adipic acid is therefore rejected.

EXAMPLES

In the following experiments 3 buffer systems A, B and C were used with the following composition (Table 1):

TABLE 1

| Buffers | Concentration of adipic acid $C_{H_2Ad}$ mole/l | Concentration of sodium hydroxide $C_{NaOH}$ mole/l | pH at 70° C. |
|---|---|---|---|
| A | 1.00 | 1.00 | 4.83 |
| B | 0.5 | 0.39 | 4.60 |
| C | 0.7 | 0.36 | 4.32 |

To each of these 3 buffers free adipic acid was added in an amount of additional 1.5 moles of acid per liter to obtain the buffer systems A', B' and C' respectively, referred to below.

The buffer systems were then subjected to intimate contact with a gas phase containing nitrogen, steam to saturation and carefully adjusted amounts of SO₂. Equilibrium was reached when the SO₂ concentration in the liquid phase was found to be constant at constant conditions. In each case the partial pressure of SO₂, $P_{SO_2}$ (atm.), above the liquid and the concentration of dissolved SO₂ in the liquid, $C_{SO_2}$ (mole/l), together with pH before and after addition of SO₂, were determined. The values found are given in table 2.

TABLE 2

Equilibrium experiments at 70° C.

| Ex. | Buffer | $P_{SO_2}$ atm. | $C_{SO_2}$ mole/l | pH Before SO₂—addition | pH After SO₂—addition |
|---|---|---|---|---|---|
| 1 | A | 0.00180 | 0.112 | 4.83 | 4.68 |
| 2 | A | 0.00380 | 0.218 | 4.83 | 4.55 |
| 3 | A | 0.00637 | 0.298 | 4.83 | 4.50 |
|   | B | " | 0.159 | 4.60 | 4.23 |
|   | C | " | 0.110 | 4.32 | 4.11 |
| 4 | A | 0.00948 | 0.373 | 4.83 | 4.45 |
|   | B | " | 0.194 | 4.60 | 4.18 |
|   | C | " | 0.144 | 4.32 | 4.07 |
| 5 | A | 0.00743 | 0.330 | 4.83 | 4.48 |
|   | B | " | 0.176 | 4.60 | 4.22 |
|   | C | " | 0.126 | 4.32 | 4.10 |
| 6 | A' | 0.00648 | 0.0740 | 4.10 | 4.04 |
|   | B' | " | 0.0353 | 3.72 | 3.69 |
|   | C' | " | 0.0283 | 3.62 | 3.59 |
| 7 | A' | 0.0100 | 0.113 | 4.10 | 4.01 |
|   | B' | " | 0.0508 | 3.72 | 3.65 |
|   | C' | " | 0.0450 | 3.62 | 3.54 |
| 8 | A' | 0.00731 | 0.0798 | 4.10 | 4.03 |
|   | B' | " | 0.0370 | 3.72 | 3.69 |
|   | C' | " | 0.0298 | 3.62 | 3.59 |

A comparison of $C_{SO_2}$ in those examples in which $P_{SO_2}$ is (approximately) the same in the buffer systems with and without extra adipic acid being added, provides a demonstration of the effect of the acid addition on the stripping of SO₂ and the saving in the consumption of stripping steam which this may result in.

By comparing for instance Ex. 3 with Ex. 6 it will be seen that $C_{SO_2}$ in Ex. 6 is about one fourth or less of $C_{SO_2}$ in Ex. 3. This means that the steam consumption necessary to remove SO₂ from A, B and C, will be substantially lower after the addition of acid which transforms the buffers A, B and C into A', B' and C' respectively.

The picture will become even clearer by the following analysis:

In FIG. 1 a plot has been made of $P_{SO_2}=f(C_{SO_2})$ for the results of the experiments with buffers A and A' given in Table 2. Approximate equilibrium curves are drawn through the respective data points and origo. From the curve for buffer A it will be seen that a gas having e.g. $P_{SO_2}$-0.002 atm. will give $C_{SO_2}=0.12$ mole/l at equilibrium (point X). After addition of 1.5 mole/l of adipic acid at the same $C_{SO_2}$ the $P_{SO_2}$ according to the curve for buffer A' will increase to 0.011 atm. (point Y), i.e. to a value which is about 5 times the partial pressure before the addition of 1.5 mole/l of free acid. Corresponding results are also found from the results of the experiments with buffers B, B' and C, C'. This means that the consumption of stripping steam will be reduced by a factor of about 1/5 by means of the specified addition of adipic acid.

The solubility of the free acid as a function of temperature has been examined, and the results are listed in table 3. They are based on visual observations.

TABLE 3

| Temperature °C. | Buffer | Amount of H₂Ad (mole/l) which can be added to the buffers before saturation occur |
|---|---|---|
| 50 | A | 0.57 |
|   | B | 0.52 |
|   | C | 0.30 |
| 40 | A | 0.30 |
|   | B | 0.25 |
|   | C | 0 |

TABLE 3-continued

| Temperature °C. | Buffer | Amount of H$_2$Ad (mole/l) which can be added to the buffers before saturation occur |
|---|---|---|
| 30 | A | ~0.05 |
|  | B | ~0.05 |
|  | C | precipitation of H$_2$Ad in pure C |

The results demonstrate that the buffers A and B must be cooled to about 30° C. to obtain the proper concentration (cf. Table 1) of adipic acid if it is started with a higher concentration of acid. For buffer C a cooling to 40° C. is sufficient. This means that if buffer A has been used for SO$_2$ absorption, and adipic acid has then been added to promote the stripping of SO$_2$ by steam stripping, it is necessary to cool to about 30 ° C. to precipitate adipic acid in order to return to buffer A which may then be used for new absorption.

I claim:

1. A process for removal of sulphur dioxide from exhaust gases by absorption in an aqueous solution containing ions of adipic acid, and stripping of sulphur dioxide with steam, wherein solid adipic acid is added to the absorption solution before or during the steam stripping in such an amount that all the acid is dissolved at the stripping temperature, and after the stripping the solution is cooled to substantially below the absorption temperature to precipitate solid adipic acid which is separated off and is added again after the absorption which takes place with a solution which is unsaturated with adipic acid.

2. The process of claim 1, wherein adipic acid is added to the absorption solution in the form of previously precipitated adipic acid and dissolving it by heating the absorption solution before the steam stripping.

* * * * *